2,781,366
Patented Feb. 12, 1957

2,781,366

11β,21-DIHYDROXY-4,16,20-PREGNATRIENE-3-ONE AND ESTERS THEREOF

William P. Schneider, Kalamazoo, Mich., assignor to The Upjohn Company, Kalamazoo, Mich., a corporation of Michigan No Drawing. Application July 11, 1955, Serial No. 521,365

2 Claims. (Cl. 260—397.45)

This invention relates to novel steroids, more particularly to 11β-hydroxy-21-acyloxy-4,16,20-pregnatriene-3-ones. These steroids may be represented by the following formula:

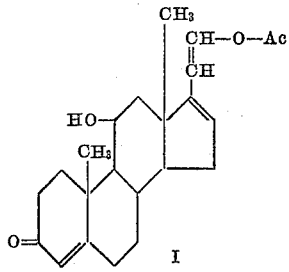

wherein Ac represents the acyl radical of a lower-aliphatic hydrocarbon carboxylic acid containing from one to twelve carton atoms, inclusive.

It is an object of the present invention to provide the novel 11β - hydroxy - 21-acyloxy-4,16,20-pregnatriene-3-ones and a process for their production. Another object is the provision of novel physiologically active naturally occurring and synthetic hormones and a process for their production from the novel compounds of the present invention. Other objects will be apparent to those skilled in the art to which this invention pertains.

According to the present invention, 3-keto-11β-hydroxy-4,17 (20)-pregnadiene-21-al, which can be prepared by the oxidation with activated manganese dioxide of 11β,21-dihydroxy-4,17(20)-pregnadiene-3-one as disclosed in the copending application 360,374 of Beal and Hogg, now U. S. Patent 2,732,384, is reacted with a ketene, anhydride or isopropenyl ester of a lower-aliphatic hydrocarbon carboxylic acid containing from two to twelve carbon atoms, inclusive, or with formic acid to produce an 11β-hydroxy-21-acyloxy-4,16,20-pregnatriene-3-one (I) of the present invention.

The novel compounds of the present invention are useful intermediates in the production of both naturally occurring and synthetic hormones having adrenal cortical hormone-like activity. For example, treatment of an 11β - hydroxy - 21-acyloxy-4,16,20-pregnatriene-3-one of the present invention with one molar equivalent of perbenzoic acid in methylene chloride at room temperature followed by bromination with one molar equivalent of bromine and then reaction with potassium acetate in acetone is productive of 3-keto-11β-hydroxy-16,17-oxido-20-acetoxy-4-pregnene-21-al which, is hydrolyzed with sodium hydroxide to 3-keto-11β,20-dihydroxy-16,17-oxido-4-pregnene-21-al, and then converted in refluxing pyridine to 11β,21-dihydroxy-16,17-oxido-4-pregnene-3,-20-dione. Acetylation of this 11β,21-dihydroxy-16,17-oxido-4-pregnene-3,20-dione with acetic anhydride in pyridine followed by reaction with hydrogen bromide in methylene chloride at room temperature and then with zinc and acetic acid at room temperature is productive of 11β,17α-dihydroxy-21-acetoxy-4-pregnene - 3,20 - dione (hydrocortisone acetate).

Alternatively, treatment of an 11β-hydroxy-21-acyloxy-4,16,20-pregnatriene-3-one of the present invention with a molar equivalent of hypobromous or hypochlorous acid, bromine or chlorine is productive of a 3-keto-11β-hydroxy-16-halo-4,17(20)-pregnadiene - 21 - al wherein the halogen is chlorine or bromine. Reaction of this compound with a chemical equivalent of sodium borohydride in methanol at about twenty degrees centigrade is productive of 11β,21-dihydroxy-16-halo-4,17-(20)-pregnadiene-3-one. Acetylation of this compound with an acylating derivative of an organic carboxylic acid, preferably of a hydrocarbon carboxylic acid containing from one to twelve carbon atoms, inclusive, e. g., formic, acetic, propionic, cyclopentylpropionic, trimethylacetic, phenylpropionic, phenylacetic, diphenylacetic, triphenylacetic, etc., is productive of an 11β-hydroxy-21-acyloxy-16-halo-4,17(20) - pregnadiene - 3 - one. Oxidative hydroxylation of this compound with a catalytic amount of osmium tetroxide and from two to three molar equivalents of hydrogen peroxide or phenyliodoso acetate in the presence of a small amount of water is productive of an 11β,17α-dihydroxy-16-halo-21-acyloxy-4-pregnene-3,-20-dione wherein the halogen is chlorine or bromine. Reacting the bromo compound with cadmium fluoride, silver fluoride or lead fluoride is productive of the corresponding 16-fluoro compound. Similarly, the bromo compound is converted, with sodium iodide in acetone, to the 16-iodo compound. These compounds have adrenocorticoid and mineralocorticoid activity and are especially useful in the treatment of inflammatory conditions of the skin due to bacteriological infections or contact dermatitis, e. g., in the form of an ointment or creme commonly used in formulations with hydrocortisone or hydrocortisone acetate. In all of the compounds employed in or produced by the reactions described hereinabove, the 21-acyloxy group is preferably acetoxy. Dehalogenation with zinc and acetic acid of the 11β,17α - dihydroxy-16-iodo-21-acyloxy-4-pregnene-3,20-dione or the corresponding 16-bromo compound is productive of the corresponding ester of hydrocortisone.

The novel compounds of the present invention (I) are prepared by the reaction of 3-keto-11β-hydroxy-4,17-(20)pregnadiene-21-al with 98 percent formic acid at room temperature, a lower-aliphatic anhydride at room temperature in the presence of p-toluenesulfonic acid or under the conditions described in Helv. Chim. Acta, 22, 894 (1939), with a lower-aliphatic acid chloride in the presence of pyridine at room temperature or with a ketene or isopropenyl ester of a lower-aliphatic acid under mild conditions. Elevated temperatures are to be avoided as a reaction with the 3-keto group will also occur. Compounds thus-produced include those represented by Formula I wherein the acyl radical is, for example, the acyl radical of formic, acetic, propionic, butyric, isobutyric, valeric, hexanoic, heptanoic or octanoic acid.

The following example is illustrative of a compound of the present invention and a process for its production, but is not to be construed as limiting.

*Example 1.—11β-hydroxy-21-acetoxy-4,16,20-pregnatriene-3-one*

A solution of 500 milligrams of 3-keto-11β-hydroxy-4,17(20)-pregnadiene-21-al, prepared as described in copending application 360,374, now U. S. Patent 2,732,384, and twenty milligrams of p-toluenesulfonic acid in five milliliters of acetic anhydride was maintained at room temperature for two hours. The mixture was cooled to zero degree centigrade, filtered, the crystals washed with ether and then dried. The filtrate was poured into water and the resulting oil extracted with ether. The ether solution was washed with water, aqueous sodium bicarbonate, aqueous sodium chloride and then dried. The ether was evaporated leaving an oil which crystallized upon mixing with a small amount of ether. The crystals were filtered, washed with a small amount of cold ether and dried. The combined crystalline fractions were crystallized twice from ethyl acetate to give 11β-hydroxy-21-acetoxy-4,16,20-pregnatriene-3-one melting at 238 to 250 degrees centigrade, having an $E_{247}$ of 32,600 in ethanol, having an infrared spectrum analysis consistent with the structure and the analysis below.

Calculated for $C_{23}H_{30}O_4$: C, 74.56; H, 8.16. Found: C, 74.14, 74.58, 74.20; H, 8.00, 7.99, 8.10.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:
1. 11β-hydroxy-21-acyloxy-4,16,20 - pregnatriene - 3-one represented by the following formula:

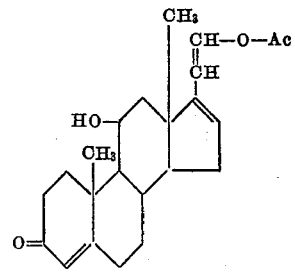

wherein Ac is the acyl radical of a lower-aliphatic hydrocarbon carboxylic acid containing from one to eight carbon atoms, inclusive.

2. 11β-hydroxy-21-acetoxy-4,16,20 - pregnatriene - 3-one.

No references cited.